United States Patent [19]
Kumar et al.

[11] Patent Number: 5,471,414
[45] Date of Patent: Nov. 28, 1995

[54] FAST STATIC CMOS ADDER

[75] Inventors: Sudarshan Kumar; Jashojiban Banik, both of Aloha, Oreg.

[73] Assignee: Intel Corporation, Santa Clara, Calif.

[21] Appl. No.: 32,607

[22] Filed: Mar. 17, 1993

[51] Int. Cl.[6] .................................. G06F 7/50; G06F 7/38
[52] U.S. Cl. .............................. 364/788; 364/736
[58] Field of Search ................................. 364/736, 786, 364/788, 784

[56] References Cited

U.S. PATENT DOCUMENTS

| | | | |
|---|---|---|---|
| 4,573,137 | 2/1986 | Ohhashi | 364/788 |
| 4,707,800 | 11/1987 | Montrone et al. | 364/788 |
| 4,942,547 | 7/1990 | Joyce et al. | 364/736 |
| 5,047,976 | 9/1991 | Goto et al. | 364/788 |
| 5,126,965 | 6/1992 | Asato et al. | 364/788 |
| 5,163,020 | 11/1992 | Chau | 364/788 |
| 5,272,662 | 12/1993 | Scriber | 364/788 |

*Primary Examiner*—Tan V. Mai
*Attorney, Agent, or Firm*—Blakely, Sokoloff, Taylor & Zafman

[57] ABSTRACT

An N-bit conditional sum adder comprised of a number of 2-bit adders coupled in series. The 2-bit adders have a sum generation circuit which computes two sum bits from two 2-bit inputs. Each sum bit is processed by a maximum of two multiplexers in series for factoring any carry-ins from preceding 2-bit adders, regardless of the total number of N bits to be added. A carry generation circuit generates two carry signals. The appropriate carry signal is selected for propagation by a multiplexer comprised of a number of p-n passgates. The two carry signals plus their complements are first buffered before being input to the multiplexer. The multiplexer outputs the appropriate carry signal and its complement to be input to a succeeding 2-bit adder and for controlling a succeeding multiplexer selection.

26 Claims, 10 Drawing Sheets

FAST STATIC CMOS ADDER

FIELD OF THE INVENTION

The present invention pertains to the field of digital adders. More particularly, the present invention relates to a fast CMOS conditional sum adder.

BACKGROUND OF THE INVENTION

One of the basic functions to the operation of virtually all computer systems is the capability of adding two integers together. Having an addition function is essential because not only is addition used to provide numerical sums to users, but it is also used in the implementation of numerous logic functions internal to the computer system. Hence, one or more adders are typically found in the arithmetic logic unit of a computer's microprocessor.

When two bits are added together, the result is a sum of those two bits plus a carry to the next (i.e., leftward) position. Thus, the addition of multiple bits can be effectuated by using the carry-out of one set of bits as the carry into the neighboring set of bits on its left. For example, the binary addition of the two bits "11" and "01" is performed by first adding together the two least significant bits "1" and "1." The result is a sum of "0" with a carry-out bit of "1." The carry-out bit is factored as a carry bit to the addition of the next set of bits, "0" and "1." The result is a sum of "0" with a carry-out of "1." This yields a final correct answer of "100" (i.e., 3+1=4). This type of adder is known as a ripple carry adder because the addition function involves rippling the carry, which can be either a 1 or a 0, all the way from the rightmost bit to the leftmost bit.

One problem, however, associated with ripple carry and other similar types of adders is that it takes time to ripple the carry signal. In some cases, two levels of logic are implemented in computing the carry-out from a carry-in. Hence, if the least significant bit generates a carry which is propagated through the length of the adder, the signal passes through 2n levels of logic before the last gate can determine whether there is a carry-out of the most significant place.

In general, the time a circuit takes to produce an output is proportional to the maximum number of logic levels through which the signal travels. This propagation delay is specially severe for cases involving the addition of large numbers having multiple bits. For example, a substantial amount of time is required to ripple the carry through the entire addition chain of two 32-bit words. Consequently, the time required to ripple the carry retards the critical time path, thereby slowing down the overall speed of the microprocessor. This detrimentally impacts the performance of the computer system.

There are numerous prior art adder designs aimed at minimizing the time required to perform binary addition. One approach involves the manipulation of multiple bits in parallel to speed up the addition process. In a design known as carry lookahead, the inputs to a number of stages are examined, while simultaneously, the proper carry for each of these stages is being calculated. Each carry is then applied to the adder corresponding to the appropriate bit.

In a conditional-sum arrangement, a sum both with a carry set to "0" and a carry set to "1" are generated for each order. A selection of one of the two sums is made based on carry information originating from the lower orders. Other various hybrid arrangements utilizing combinations of the parallel and propagate carries have been proposed to reduce the inherent time delay. The goal is to further minimize the critical time path.

Because the trend is for ever more powerful and faster computers, there is a need in the prior art for even faster adders. It would be highly preferable for such an adder to have a regular, hierarchical structure suitable for performing the addition of large numbers. Furthermore, it would also be preferable for the delay of such an adder to scale up logarithmically with an increase in the number of bits to be added.

SUMMARY OF THE INVENTION

A fast CMOS static N-bit conditional sum adder is described. The N-bit conditional sum adder is comprised of X number of M-bit adders which are coupled in series, wherein $X * M = N$. In the currently preferred embodiment, 2-bit adders are used as the basic adding block. By implementing 2-bit adders rather than 1-bit adders, the first two adder blocks can be merged, thereby eliminating one multiplexer gate delay and minimizing the critical path.

A first 2-bit adder generates the two least significant sum bits and a carry signal based on the addition of the two least significant 2-bit inputs to be added.

Succeeding 2-bit adders compute two sum bits from the addition of two 2-bit inputs and also factors in any carrys generated by preceding 2-bit adders. Two sum signals are generated for each sum bit. One sum signal is generated assuming a carry-in from a preceding 2-bit adder, while the other sum signal is generated assuming no carry-in from a preceding 2-bit adder.

A first multiplexer is used to output the first sum signal if there is a carry-in. Otherwise, the second sum signal is output by the first multiplexer. A second multiplexer coupled in parallel with the first multiplexer outputs the first sum signal if there is no carry-in. Otherwise, it outputs the second sum signal. A third multiplexer is used to select between the two signals output from the first two multiplexers. The third multiplexer makes its selection based on the carry signal being propagated in the critical path of the N-bit adder. Thus, each sum bit is processed through a maximum of only two multiplexers in series in order to account for any carry-ins, regardless of the total number of N bits to be added.

Each succeeding 2-bit adder also includes a carry generation circuit for generating two carry signals. One carry signal is generated based on the assumption that there is a carry from a preceding 2-bit adder, while the other carry signal is generated based on the assumption that there is no carry from the preceding 2-bit adder. The carry generation circuit also outputs two signals which are the two carry signals inverted.

All four carry signals are buffered and input to a multiplexer which selects the appropriate carry signal for propagation. By buffering the carry signals prior to selection by the multiplexer, the delay required to perform the buffering operation is kept out of the critical path. Furthermore, by generating the inverted signals and then buffering them in parallel with that of the non-inverted carry signals, an inverted carry signal can be produced without introducing any extra delays.

The multiplexer is comprised of four p-n passgates. Two p-n passgates select the appropriate carry signal and the other two p-n passgates select the appropriate inverted carry signal. The multiplexer makes its selection based on the carry signal and its complement which were propagated by preceding 2-bit adders. Thus, in the present invention, the critical path delay scales up logarithmically as log (n/m).

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A fast complementary metaloxide semiconductor (CMOS) digital conditional sum adder having a hierarchical structure is described. In the following description, for purposes of explanation, numerous specific details such as specific circuits, gates, etc., are set forth in order to provide a thorough understanding of the present invention. It will be obvious, however, to one skilled in the art that these specific details need not be used to practice the present invention. In other instances, well-known structures and circuits have not been shown in detail in order to avoid unnecessarily obscuring the present invention. While it is preferable for the adder of the present invention to be implemented in CMOS, the specific technology employed in this fabrication is not critical. Any one of a number of well-known processes may be used to realize the present invention.

Figure 1:
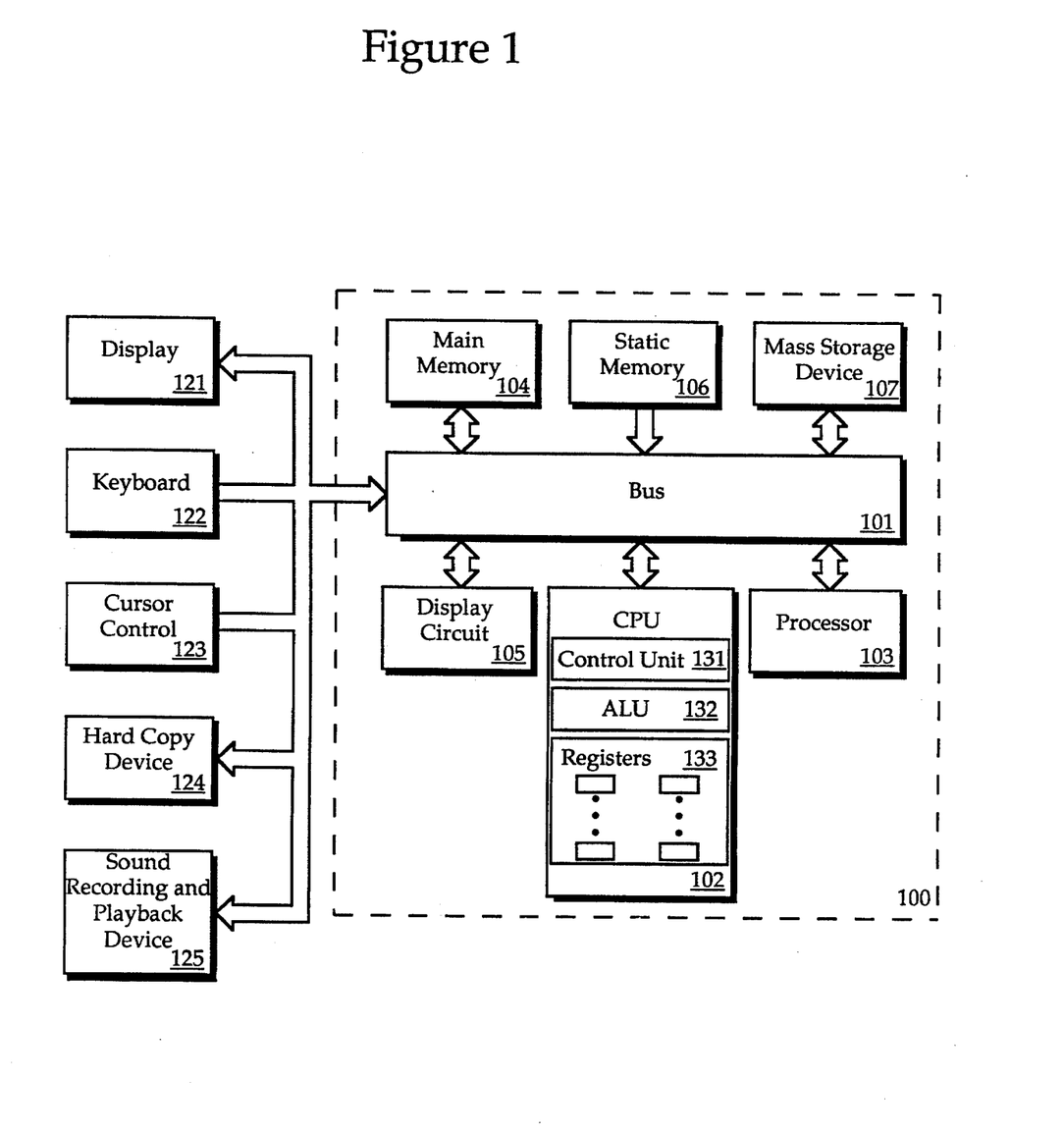
FIG. 1 shows the computer system upon which the preferred embodiment of the present invention can be implemented.

Referring to FIG. 1, the computer system upon which the preferred embodiment of the present invention can be implemented is shown as 100. Computer system 100 comprises a bus or other communication means 101 for communicating information, and a central processing unit 102 coupled with bus 101 for processing information. CPU 102 is comprised of a control unit 131, an arithmetic logic unit (ALU) 132, and several registers 133. The adder of the present invention may be implemented in ALU 132. Furthermore, a number of coprocessors 103 can be coupled onto bus 10 1 for additional processing power and speed.

System 100 further comprises a random access memory (RAM) or some other dynamic storage device 104 (referred to as main memory), coupled to bus 101. Main memory 104 is used in storing information and instructions to be executed by CPU 102. Main memory 104 also may be used for storing temporary variables or other intermediate information during execution of instructions by CPU 102. Computer system 100 also comprises a read only memory (ROM) and/or other static storage device 106 coupled to bus 101 for storing static information and instructions for processor 102. A data storage device 107 such as a hard or floppy disk drive can be coupled to bus 101 for storing information and instructions.

A display device 121, such as a cathode ray tube (CRT), can be coupled to bus 101. Display device 121 is used to display information to a computer user. An alphanumeric input device 122, including alphanumeric and other keys, may also be coupled to bus 101 for communicating information and command elections to processor 102. Another type of user input device is cursor control 123, such as a mouse, a trackball, or cursor direction keys, coupled to bus 101 for communicating direction information and command selections to processor 102 and for controlling cursor movement on display 121. This input device typically has two degrees of freedom in two axes, a first axis (e.g., x) and a second axis (e.g., y) which allows the device to specify any position in a plane. Another device which may be coupled to bus 101 is hard copy device 124 which may be used for printing instructions, data, or other information on paper, film, or some other medium.

Overview of the Present Invention

Figure 2:
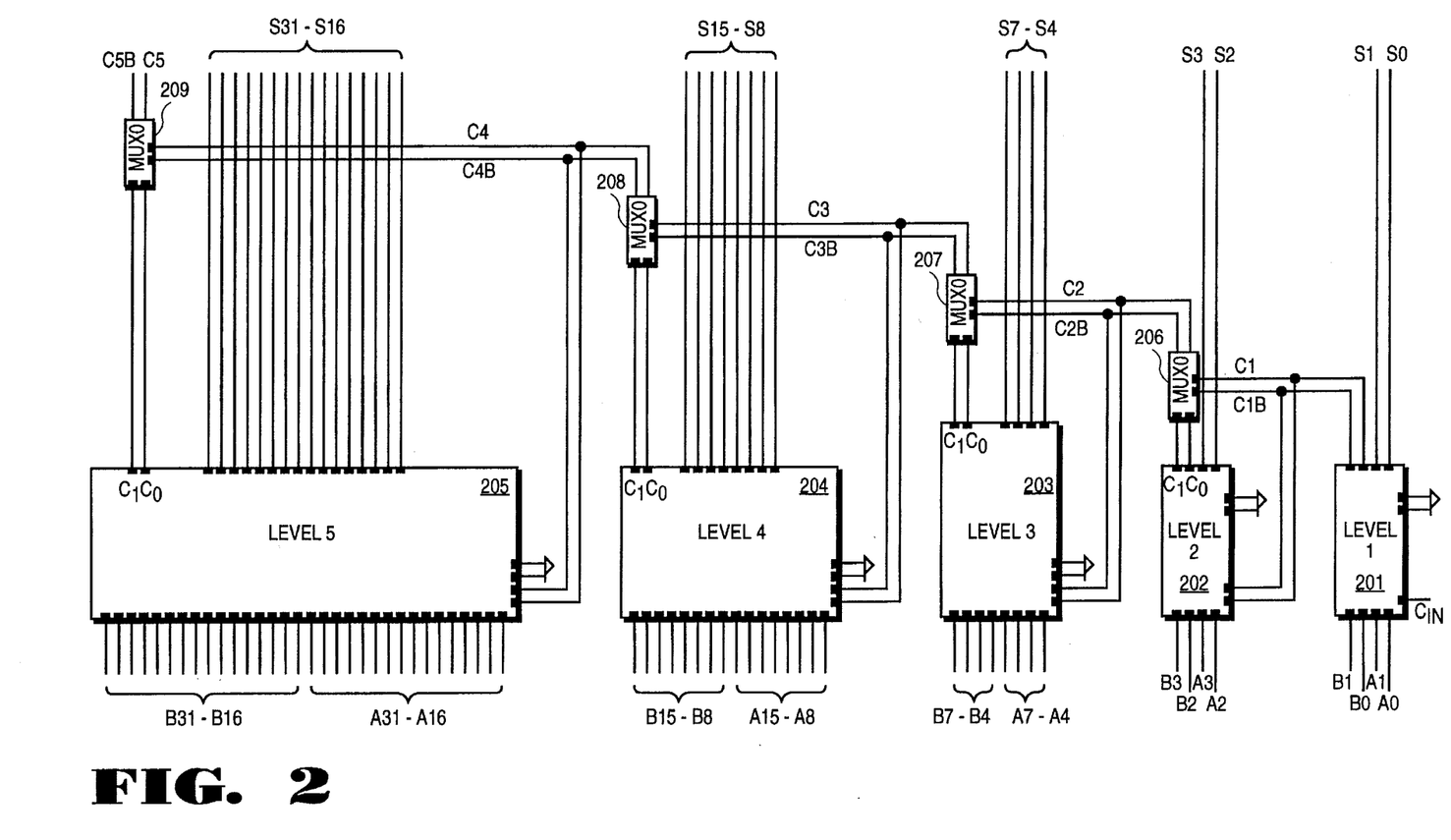
FIG. 2 shows a block diagram of a 32-bit embodiment of the adder of the present invention.

FIG. 2 shows a block diagram of a 32-bit embodiment of the adder of the present invention. The present invention's hierarchical architecture of the five levels 201–205 coupled together through the four multiplexers 206–209 is illustrated. In the first level 201 of the hierarchy, two bits A0–A1 and B0–B1 of input are provided for the least significant two bits of the numbers to be summed together. The first level 201 computes and outputs the two least significant sum bits S0–S1. The first level 201 also generates a carry-out C1 and its complement C1B. In the second level 202, two more bits A2–A3 and B2–B3 are added together, and the carry-out C1 and C1B from the first level 201 is factored into calculating the next two sum bits S2 and S3. The carry-out C1 and its complement C1B are also input to multiplexer 206. They are used by multiplexer 206 to select which of the two carry-outs $C_0$ or $C_1$ from the second level 202 is to be sent to multiplexer 207. Carry-out $C_0$ assumes that input carry bit is 0, whereas carry-out $C_1$ assumes that input carry bit is a1.

The carry-out C2 and its complement C2B selected by multiplexer 206 from the second level 202 are input into multiplexer 207. They determine which of the two carry-outs $C_0$ and $C_1$ from the third level 203 is to be sent to multiplexer 208. Similarly, the third level 203 accepts inputs of the next four bits A4–A7 and B4–B7 to be summed together. These inputs plus the carry-out selected by multiplexer 206 from the second level 202 are used to determine the next four sum bits S4–S7. The third level 203 also generates two possible carry-outs $C_0$ and $C_1$.

The operation of the fourth level is very similar to those of the previous three levels except that the next eight bits A8–A15 and B8–B15 are summed together along with the selected carryout C3 and C3B from multiplexer 207 to produce the next eight sum bits S8–S15. One of the two possible carry-outs $C_0$ and $C_1$ from the fourth level 204 is selected by multiplexer 208 based on C3 and C3B. The selected carry-out C4 and its complement C4B are input to multiplexer 209.

The fifth level 205 accepts the next sixteen bits A16–A31 and B16–B31 along with the carry-out C4–C4B from multiplexer 208 and computes the last sixteen sum bits S16–S31. Multiplexer 209 selects which of the two carry-outs $C_0$ or $C_1$ to output as the final carry-out C5 and its complement C5B. Multiplexer 209 makes its selection based on the carry-out signal C4 and its complement C4B from multiplexer 208.

Generally, in a conditional sum adder, for each pair of bits of input, two results are created. In the first result, sum and carry bits are prepared as though the input carry bit were a 0. The second result is generated assuming the input carry bit to be a 1. When the input carry bit is calculated, the appropriate sum and carry bits are selected based thereon.

The selected outputs from the second level depend on the carry output bit from the first level. Similarly, the outputs from the third level depend on the carry output bit from the second level. This procedure is continued, examining the results in quartets, octets, etc. One goes from the pairs of stages in the first level to quartets in the second level. In the third level, octets are implemented. Each time a level is added, the number of stages in each n-tet is doubled.

Thus, five levels are needed in the present invention to implement a 32-bit adder. In the general case for N bits, the number of levels required is $\log_2 N$. For example, a 64-bit adder can be implemented with the addition of a sixth level and one more multiplexer. For a 32-bit adder, the critical path for the most significant sum bit goes through a carry generation circuit and four multiplexer gates. Adding one level to the hierarchy adds one multiplexer gate delay to the critical path. For example, a 64-bit adder entails an extra delay of just one multiplexer gate. Consequently, the delay scales up logarithmically with additional bits, thereby rendering the present invention very suitable for large, fast summation processes. Furthermore, merging the first two levels into one level and having a unit for each two bits of input for the first level saves one multiplexer gate delay, which minimizes the critical path delay.

Figure 3:
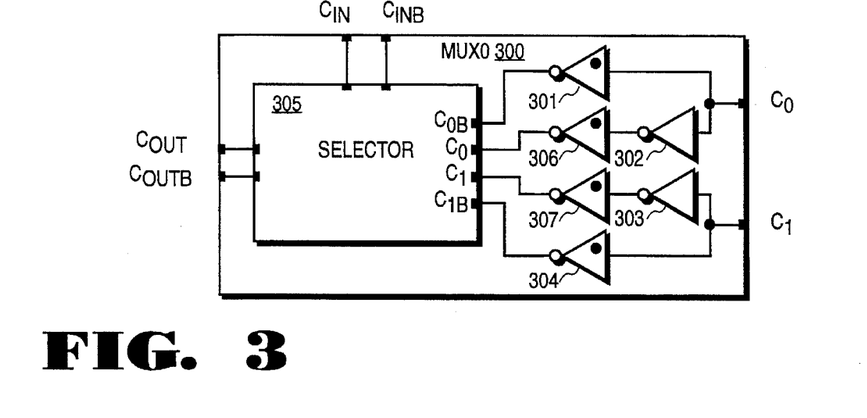
FIG. 3 shows a circuit diagram of a sample multiplexer used to select a carry-out signal.

FIG. 3 shows a circuit diagram of one of the multiplexers 300. The carry-out signal $C_0$ generated by one of the levels is input to inverters 301 and 302. Similarly, the carry-out signal C1 generated by one of the levels is input to inverters 303 and 304. The outputs from inverters 301 and 304 are input to selector 305. The outputs from inverters 302 and 303 are respectively passed through inverters 306 and 307 before being fed into selector 305. Based on the signal $C_{in}$ and its complement $C_{inb}$, either $C_0$ or $C_1$ will be output as $C_{out}$ and its complement $C_{outb}$ by selector 305. Note that the two carry-out signals C0 and C1 are inverted and that C0, C1, C0B and C1B are buffered prior to being selected by selector 305. Hence, the process of generating inverted carry signals and buffering all four carry signals occur outside of the critical path.

Figure 4:
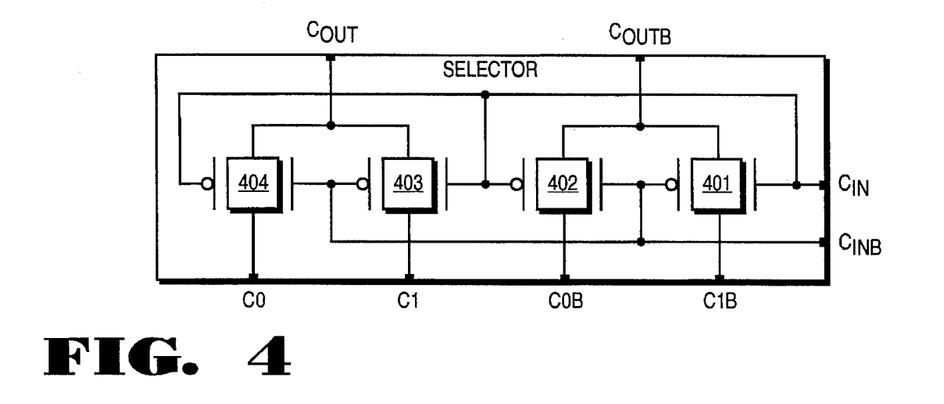
FIG. 4 shows a detailed circuit diagram of a selector of a carry-out multiplexer.

FIG. 4 shows a detailed circuit diagram of selector 305. Four passgates 401–404 are used to determine the output signals $C_{out}$ and $C_{outb}$. In principle, a passgate conducts when its p-channel gate is low (i.e., "0") and its n-channel gate is set high (i.e., "1"). Conversely, if the p-channel gate is set high while the n-channel gate is set low, the passgate is non-conducting. It is advantageous to use passgates because of their fast switching response time.

Referring to FIG. 4, passgates 401 and 402 determine whether $C_{0b}$ or $C_{1b}$ is to be selected for output as $C_{outb}$. The selection depends on $C_{in}$ and $C_{inb}$. Passgates 403 and 404 determine whether $C_0$ or $C_1$ is to be selected for output as $C_{out}$. This selection is also based on $C_{in}$ and $C_{inb}$. If $C_{in}$ is set high and $C_{inb}$ is set low, passgates 40 1 and 403 are turned on (i.e., conducting) while passgates 402 and 404 are turned off (i.e., nonconducting). This results in $C_{out} = C_1$ and $C_{outb} = C_{1b}$. If $C_{in}$ is set low and $C_{inb}$ is set high, passgates 401 and 403 are off while passgates 402 and 404 are on. This results in $C_{out} = C0$ and $C_{outb} = C_{0b}$. Table 1 shows the relationships between $C_0$, $C_1$, $C_{0b}$, $C_{1b}$, $C_{out}$, $C_{outb}$, $C_{in}$, and $C_{inb}$.

TABLE 1

| $C_{in}$ | $C_{inb}$ | $C_{out}$ | $C_{outb}$ |
| --- | --- | --- | --- |
| 0 | 1 | $C_0$ | $C_{0b}$ |
| 1 | 0 | $C_1$ | $C_{1b}$ |

As an example, referring back to FIG. 2, C3 and C3B of multiplexer 208 correspond to $C_{in}$ and $C_{inb}$ of FIGS. 3 and 4; $C_0$ and $C_1$ correspond to the C0 and C1 inputs to the inverters which eventually produces C0, C1, C0b and C1b; and C4 and C4B correspond to Cout and Coutb.

Detailed Description of Each Level of the Adder

Figure 5:
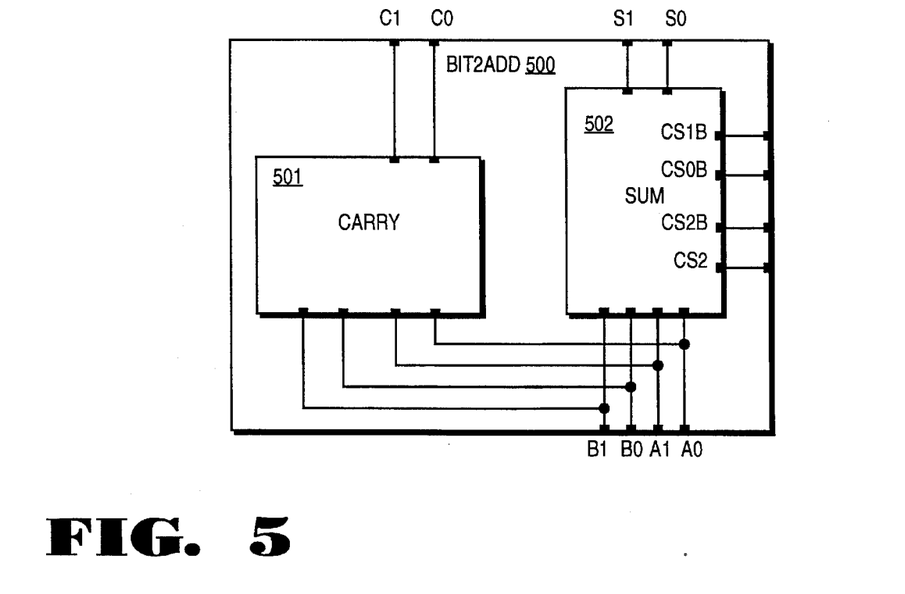
FIG. 5 is a circuit diagram illustrating the basic design of the first and second levels of the 32-bit embodiment of the present invention.

Each level of the 32-bit embodiment of the present invention will now be described in detail. Levels 1 and 2 share the same basic circuit design. However, level 1 can accept a carry-in signal from an outside source. FIG. 5 is a circuit diagram illustrating the basic design of the first and second levels. It should be noted that 1-bit, 2-bit, 3-bit, etc., adders can be used as the basic adder block. In the currently preferred embodiment 2-bit adder blocks are used rather than 1-bit adders because the first two adder blocks can be merged, thereby eliminating one multiplexer gate delay in the critical path. Block 500 is designated as BIT2ADD because it performs the addition of two bits. The BIT2ADD design is replicated and is used many times in each of the higher levels. The BIT2ADD block 500 is comprised of a carry 501 and a sum 502 circuit. For the first level, the inputs to CS1B and CS0B are respectively hardwired to 0 and 1. The carry-in from a source external to the adder (e.g., the multiplier), can be factored in by using CS2 and CS2B. For a carry-in of 0, CS2 is set to 0 and CS2B is set to 1. Conversely, for a carry-in of 1, CS2 is set to 1 and CS2B is set to 0. The two least significant bits to be added together A0–A1 and B0–B1 are input to both carry circuit 501 and sum circuit 502. Carry circuit 501 generates two carryouts: C0 and C1. The C0 signal assumes that the carry-in is a 0, whereas the C1 signal assumes that the carry-in is a 1. The sum circuit 502 calculates the two sum bits S0 and S1 based on the A0–A1 and B0–B1 input bits. For example, the addition of 01 and 10 yields the sum bits of 11 with a carry-out of 0 if the carry-in is a 0. However, ff the carry-in is a 1, the sum bits would be 00 and the carry-out would be 1.

Figure 6:
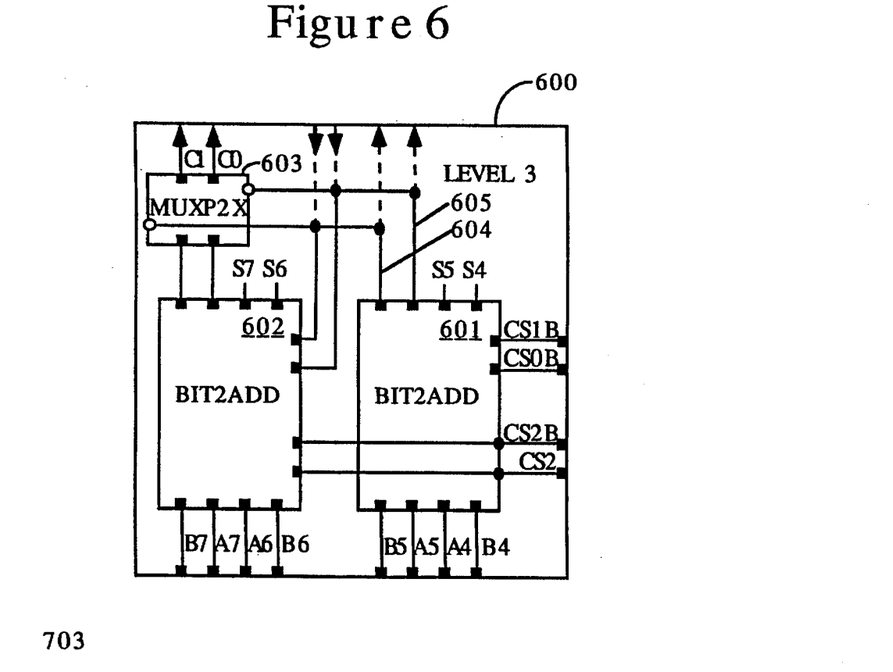
FIG. 6 is a circuit diagram illustrating the third level of the 32-bit embodiment of the present invention.

FIG. 6 is a circuit diagram illustrating the third level 600 of the 32-bit embodiment of the present invention. The third level 600 is comprised of two BIT2ADD blocks 601, 602 and a multiplexer 603 (MUXP2X). Each of the two BIT2ADD blocks 601–602 have the same circuit design as the BIT2ADD block shown in FIG. 5 and described above. The CS1B and CS0B lines of the BIT2ADD block 601 are respectively hardwired to the 0 and 1 states. The third level 601 computes the sum S4–S7 and carry-out bits $C_0$ and $C_1$ for the next four bits A4–A7 and B4–B7. Specifically, block 601 takes bits A4–A5 and B4–B5 and generates the two sum bits S4 and S5 while taking into consideration the carry-in bit CS2 and its complement CS2B from the previous level (i.e., the carry-out from level 2).

The carry-out bits $C_0$ and $C_1$ from block 60 1 are sent on lines 604 and 605 to block 602 and to multiplexer 603. In block 602, the sum bits S6–S7 are determined by adding together the input bits A6–A7 and B6–B7 while factoring in the carry-out on lines 604 and 605 from block 601 and the carry-out CS2 and CS2B from the previous level. Note that for level 3, CS2 and its complement CS2B are equivalent to the C2 and C2B signals from multiplexer 206 (as shown in FIG. 2). Block 602 also outputs two carry-out bits which are input to multiplexer 603. The carry-outs $C_0$ and $C_1$ from the third level 600 are selected by multiplexer 603 according to the signals on lines 604 and 605.

Note that when the level 3 block 600 is used in the fifth level, the outputs from BIT2ADD 601 on lines 604 and 605 are selected by another multiplexer (not shown). The selected signal is input to the BIT2ADD block 602 and is not input to multiplexer 603.

Figure 7:
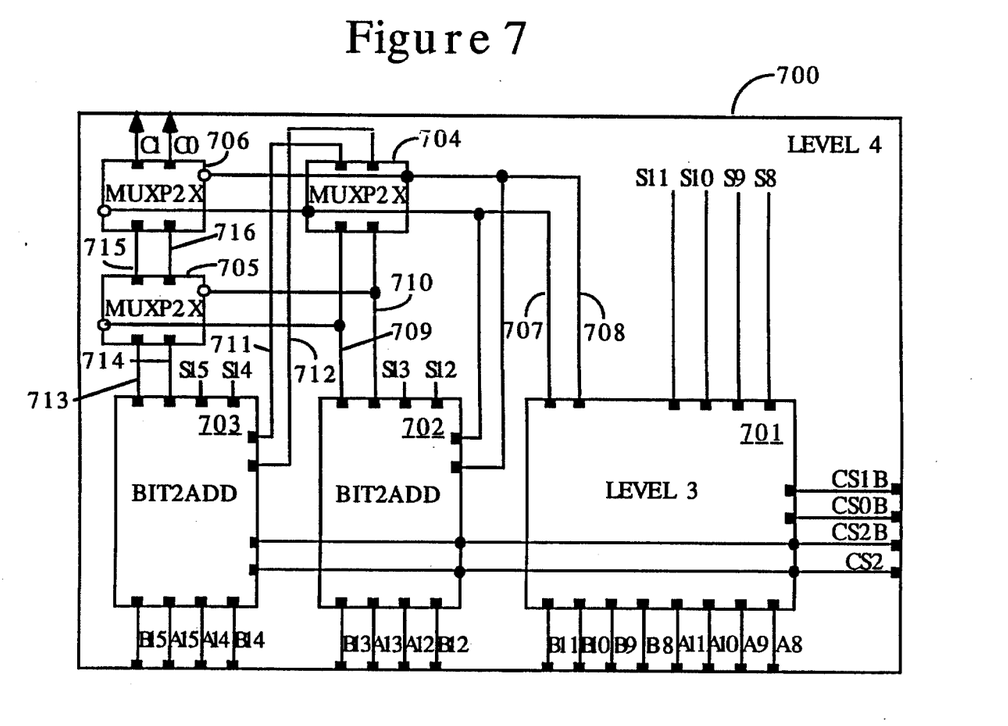
FIG. 7 is a circuit diagram illustrating the fourth level of the 32-bit embodiment of the present invention.

FIG. 7 is a circuit diagram illustrating the fourth level 700. The fourth level accepts the input of the next eight bits A8–A15 and B8–B15 to be added together. Based on these sixteen bits plus the carry-in bits CS2 and CS2B from the previous level, the fourth level 700 computes eight sum bits S8–S15 and two carry-out bits C0 and C1. The fourth level block 700 is comprised of a level three block 701, two BIT2ADD blocks 702–703, and three multiplexers (MUXP2X) 704–706. Block 701 has the same circuitry as the third level, which was described above and shown in FIG. 6. The CS1B and CS0B signals to block 701 are hardwired to 0 and 1.

The CS2 signal is the signal from multiplexer 207, and CS2B is the complement of CS2. Block 701 generates four sum bits S8–S11 and two carryout signals on lines 707–708 based on input bits A8–A11 and B8–B11 plus the carry-in signals CS2 and CS2B. The BIT2ADD block 702 generates two sum bits S12–S13 according to the input bits A12–A13 and B12–B13, the carry-in signal CS2 from the previous level and its complement CS2B, and the carry-out signals on lines 707–708 from block 701. The two carry-out signals on lines 709–710 are generated based on the input bits A12–A13 and B12–B13.

The carry-out signals from BIT2ADD 702 is input to the MUXP2X multiplexer 704 and also to the MUXP2X multiplexer 705. Multiplexer 704 selects which carry-out signals on lines 709–710 are to be sent as carry-in bits to the BIT2ADD block 703. The selection is made according to the carry-out signals on lines 707–708 generated by block 701.

The BIT2ADD block 703 generates two sum bits S14–S15 and two carry-outs on lines 713–714 according to the input bits A14–A15 and B14–B15, the carry-in bits on lines 711–712 generated by BIT2ADD 702, and the carry-in CS2 and its complement CS2B from multiplexer 207.

The two carry-outs from BIT2ADD 703 are input to the MUXP2X multiplexer 705. Multiplexer 705 selects which of the signals on lines 713–714 is to be sent to multiplexer 706. The selection is performed according to the carry-out signals on lines 709–710 generated by the BIT2ADD block 702.

The outputs 715–716 from the MUXP2X multiplexer 705 is input to the MUXP2X multiplexer 706. The final carry-outs $C_0$ and $C_1$ from the fourth level is selected by multiplexer 706 based on the carry-outs on lines 707–708 generated by block 701.

Figure 8:
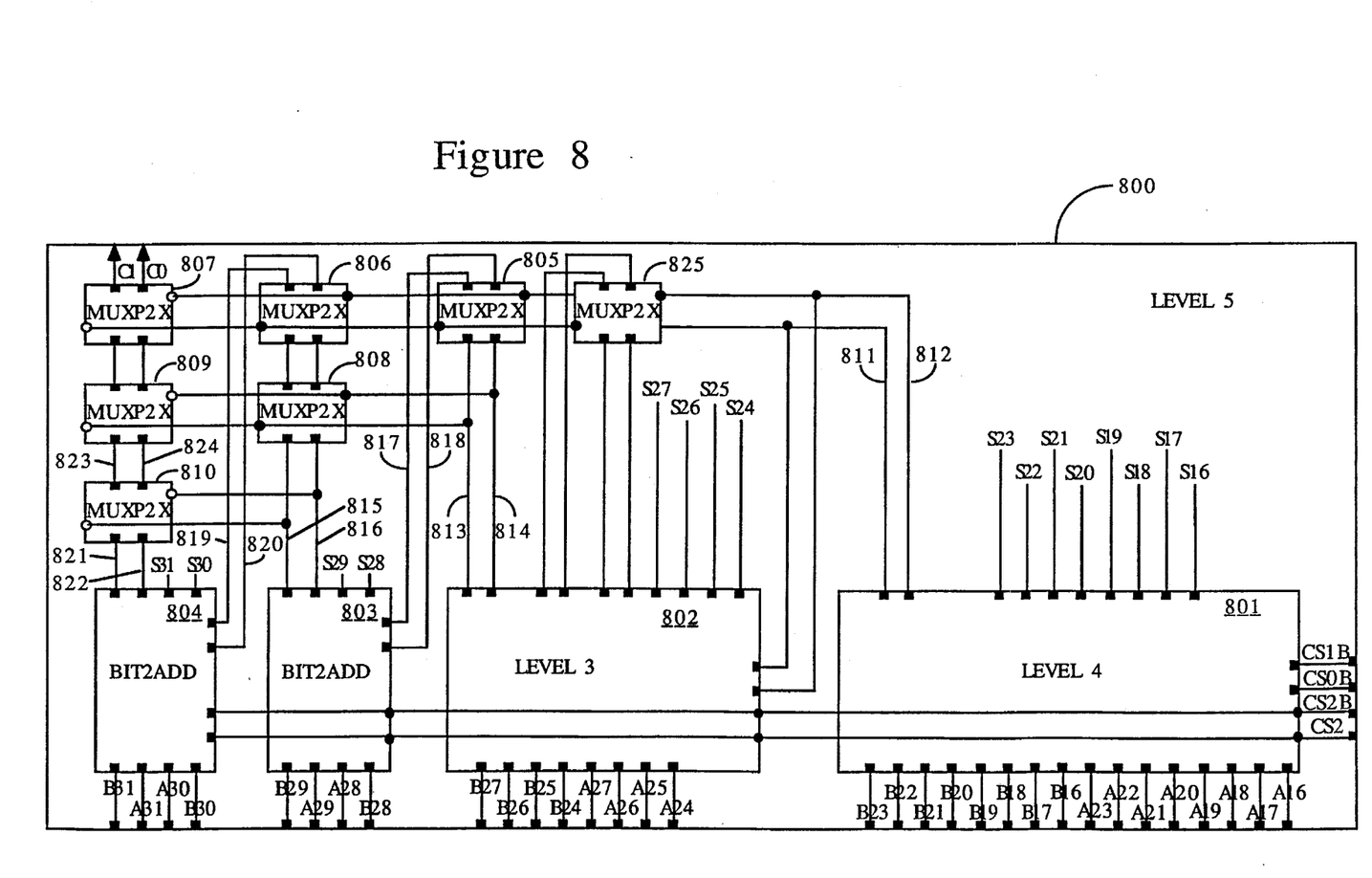
FIG. 8 is a circuit diagram illustrating the fifth level of the 32-bit embodiment of the present invention.

FIG. 8 is a circuit diagram of the fifth level 800. The last sixteen bits to be added together, A16–A31 and B16–B31, in conjunction with the carry-in signal CS2 generated by multiplexer 208 and its complement CS2B are input to the fifth level 800. Based on these inputs, the fifth level produces sixteen sum bits S16–S31 and two carry-out signals $C_0$ and $C_1$. The fifth level 800 is comprised of a level four block 801, a level three block 802, two BIT2ADD blocks 803–804, and six MUXP2X multiplexers 805-8 10. The circuitry of the level four block 801 of the fifth level 800 is the same as the circuitry of the fourth level as described above and shown in FIG. 7 as block 700. In other words, the level four block 801 is comprised of a level three block, two BIT2ADDs, and three multiplexers. Likewise, the level three block 802 and the two BIT2ADDs 803–804 have the same circuitry corresponding to the third level and the BIT2ADDs described above.

The level four block 801 computes eight sum bits S16–S23 and two carry-outs on lines 811–812. The computation is based on the eight input bits A16–A23 and B16–B23 and the carry-in CS2 and its complement CS2B from the fourth level. Note that CS2 and CS2B are equivalent to C4 and C4B shown in FIG. 2. The CS1B and CS0B are hardwired to 0 and 1. The carry-outs on lines 811–812 are input to multiplexer 805 and also to the level three block 802.

The level three block 802 calculates four sum bits S24–S27 and outputs two carry-outs on lines 813–814. As discussed above for the level three block, the outputs from one of the level three block's BIT2ADD is input to MUXP2X 825. The MUXP2X 825 selects one of the two outputs based on the carry-out signal from the level four block 801. The selected output from MUXP2X 825 is input to the other BIT2ADD block of the level three block 802.

The two carry-outs on lines 813–814 are input to multiplexer 805 and also to multiplexer 808 and 809. The calculations are based on the input bits A24–A27 and B24–B27, the carry-in signal CS2 and its complement CS2B generated by the fourth level, and the carry-outs of lines 811–812 from the level four block 801. The multiplexer 805 selects the carry-out from lines 813–814 to input to BIT2ADD 803. Its selection is based on the carry-outs of lines 811–812 from the level four block 801.

The BIT2ADD block 803 calculates two sum bits S28–S29 and outputs two carry-outs on lines 815–816. Its calculations are based on the input bits A28–A29 and B28–B29, the carry-in signal CS2 and its complement CS2B from the lower 16 bit adder, and the carry-out on lines 817–818 selected by multiplexer 805. Its carry-outs on lines 81S–816 are input to both multiplexers 808 and 810. Multiplexer 808 determines the input to multiplexers 806 based on the carry-outs on lines 813–814 from the level three block 802. The output from multiplexer 808 is input to multiplexer 806. Multiplexer 806 selects the carry-out signals which are input to BIT2ADD 804 on lines 819–820. The selection is made according to the carry-outs on lines 811–812 from the level four block 801.

The BIT2ADD block 804 calculates two sum bits

S30–S31 and outputs two carry-outs on lines 821–822. Its calculations are based on the input bits A30–A31 and B30–B31, the carry-in signal CS2 and its complement CS2B, and the carry-out signals on lines 819–820 selected by multiplexer 806. Two carry-out signals on lines 821–822 are generated by BIT2ADD 804. These carry-out signals are input to multiplexer 810. Multiplexer 810 selects and outputs signals on lines 823–824 to input to multiplexer 809. Multiplexer 810 makes its selection based on the carry-out signals on lines 815–816 from the BIT2ADD block 803.

Multiplexer 809 makes its selection as to which signals to input to multiplexer 807 based on the carry-out signals on lines 813–814 from the level three block 802. Finally, multiplexer 807 outputs two carry-out bits $C_0$ and $C_1$ for all of the fifth level 800. The selection of the carry-out bits $C_0$ and $C_1$ by multiplexer 807 are made according to the carry-outs on lines 811–812, which were generated by the level four block 801.

Figure 9:
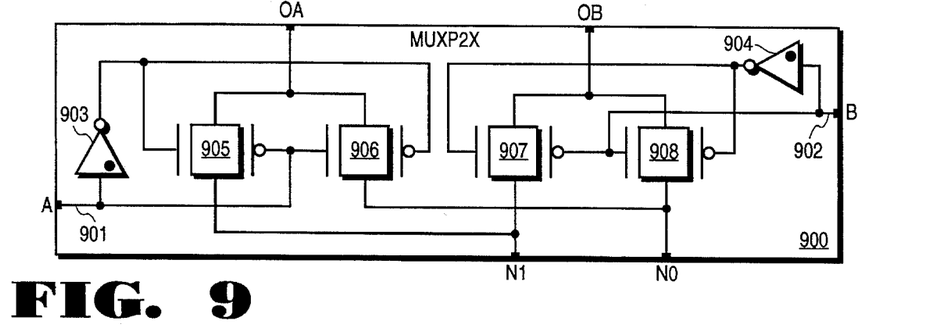
FIG. 9 is a circuit diagram illustrating a MUXP2X multiplexer.

FIG. 9 is a circuit diagram illustrating a MUXP2X multiplexer 900. Multiplexer 900 is comprised of two inverters 903–904 and four pass gates 905–908. The multiplexer 900 selects which of the two inputs N1 and N0 are to be output as 0A and 0B. The selection is made based on the A and B signals on lines 901–902. If signal A on line 901 is low (i.e., "0"), the output from inverter 903 is high. The n-channel gate of passgate 905 would be high while its p-channel gate is low. This causes passgate 905 to be conducting.

Furthermore, the n-channel gate of passgate 906 is low while its p-channel gate is high, thereby causing passgate 906 to be switched off. Consequently, N1 is coupled to the output 0A through passgate 905. If the signal A on line 901 is high (i.e., "1"), the output from inverter 903 is low. The n-channel gate would be low while its p-channel gate would be high, thereby effectively switching off passgate 905. In regards to passgate 906, a high signal A would cause the p-channel gate to be set low, while its n-channel gate would be set high. This effectively switches on passgate 906, thereby coupling the input signal N0 to the output 0A.

The select signal B functions in a similar manner. If select signal B is low, the output from inverter 904 goes high. This renders the p-channel gate of passgate 908 to also go high, while its n-channel gate is set low. Hence, passgate 908 is set in the off state. However, passgate 907 is switched on because its p-channel gate is low, while its n-channel gate is set high by inverter 904. Hence, the input signal N1 is coupled to the output 0B. If the select signal B is set high, this switches off passgate 907 while passgate 908 is switched on. Thereby, the input signal N0 is coupled to the output 0B. Table 2 summarizes the function of the MUXP2X multiplexer.

TABLE 2

| | |
|---|---|
| A = 0 | 0A = N0 |
| A = 1 | 0A = N1 |
| B = 0 | 0B = N0 |
| B = 1 | 0B = N1 |

Detailed Description of the Sum Generation Circuit

Figure 10:
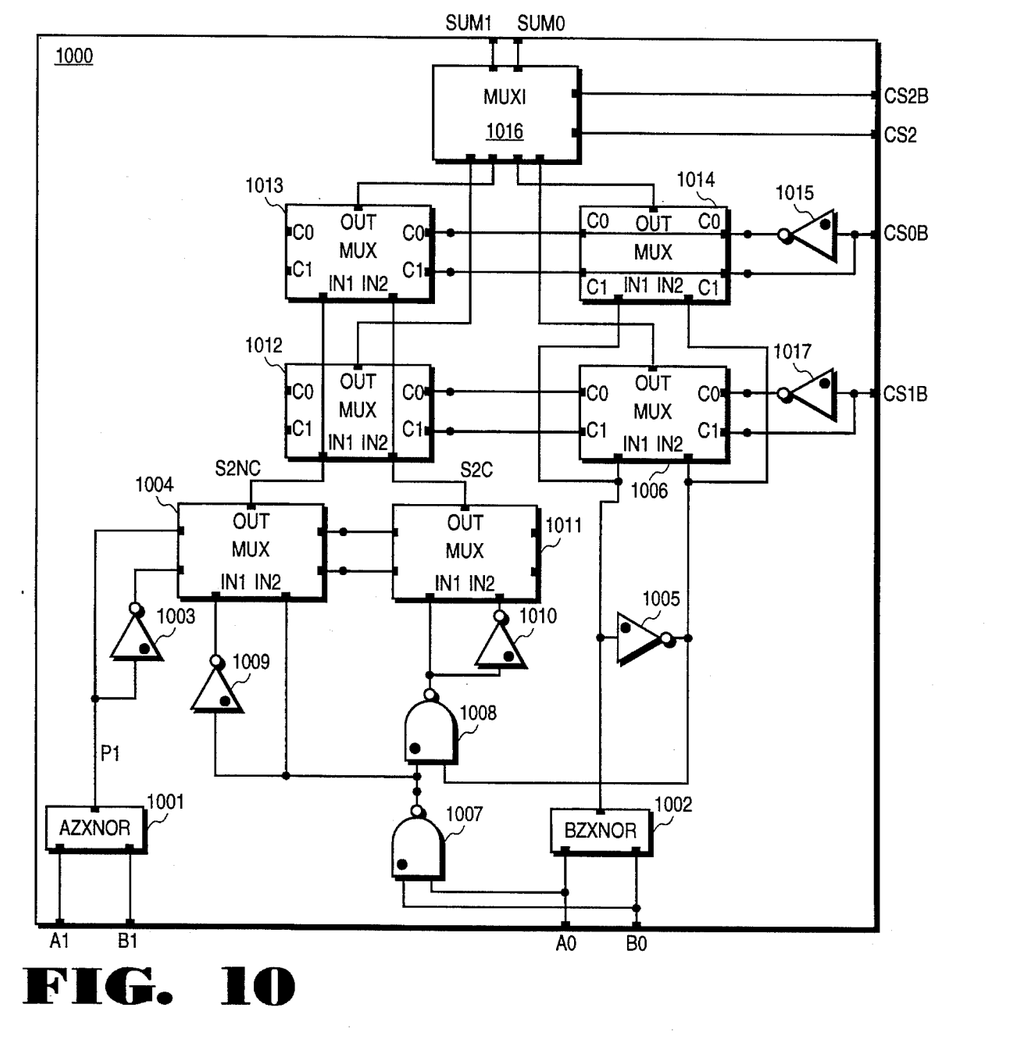
FIG. 10 is a circuit diagram showing a sum generator.

The sum generation circuit (i.e., sum block 502 of FIG. 5) is now described in detail. FIG. 10 is a circuit diagram showing a sum generator 1000. Sum generator 1000 calculates two sum bits SUM0 and SUM1 from the addition of two 2-bit inputs A0–A1 and B0–B1. Its calculations are influenced by the carry-ins CS2B, CS2, CS0B, and CS1B. In general, the A0–A1 and B0–B1 bits are processed by logic blocks 1001 and 1002. The output from logic block 1001 and its complement generated by inverter 1003 are used in the selection process of multiplexer 1004. The output from logic block 1002 and its complement generated by inverter 1005 are input to multiplexers 1006 and 1014. The A0 and B0 signals are also input to NAND gate 1007. The output from NAND gate 1007 is input to NAND gate 1008, inverter 1009, and multiplexers 1004 and 1011. The output for inverter 1005 is also input to NAND gate 1008. The output from NAND gate 1008 and its complement generated by inverter 1010 are input to multiplexer 1011. The outputs from multiplexers 1004 and 1011 are input to multiplexer 1012 and 1013.

The CS1B signal and its complement generated by inverter 1017 are coupled to and used by multiplexers 1006 and 1012 to select the appropriate output signals. Similarly, the CS0B signal and its complement generated by inverter 1015 are coupled to and used by multiplexers 1013 and 1014 in the selection process of the appropriate output signals.

The outputs from each of the four multiplexers 1006, 1012, 1013, and 1014 are input to the MUXI multiplexer 1016. Multiplexer 1016 selects the outputs SUM0 and SUM1 based on the CS2 and CS2B signals.

Note that only the five multiplexers 1006, 1012–1014, and 1016 are for generating the sum bits. This is true, irrespective of how many overall bits are to be added together. In the present invention, the number of multiplexers required to factor in the carry from previous adder blocks remains fixed and does not scale up. Whereas, in the case of typical prior art sum select adders, the number of multiplexers needed to generate the sum scales up with the numer of bits in the adder. Each sum bit is processed by a maximum of two multiplexers in series. For example, SUM0 is selected by either multiplexers 1012 or 1013 and multiplexer 1016.

Figure 11:
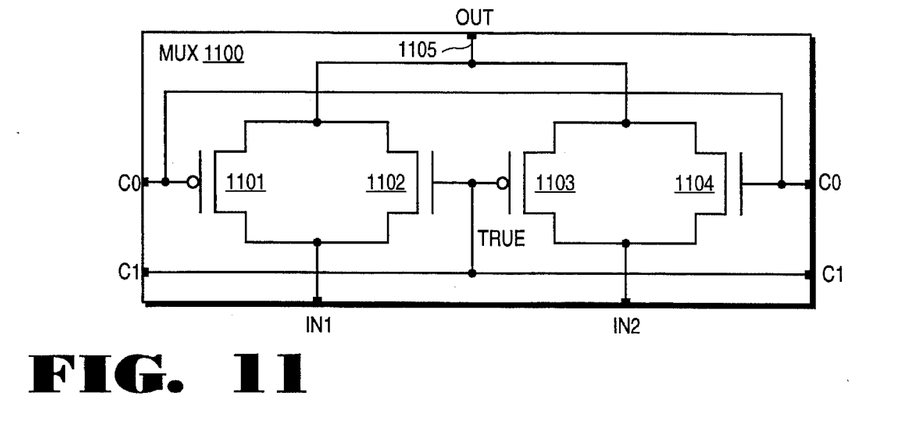
FIG. 11 is a circuit diagram illustrating one multiplexer of the sum generator.

FIG. 11 is a circuit diagram illustrating a multiplexer 1100. Multiplexer 1100 corresponds to one of the six multiplexers 1004, 1006, 1011, 1012, 1013, and 1014 (as shown in FIG. 10). One of the input signals IN1 and IN2 is selected according to signals C0 and $C_1$ to be the output signal OUT. If C0 is low and $C_1$ is high, the p-channel transistor 1101 and n-channel transistor 1102 are switched on, while p-channel transistor 1103 and n-channel transistor 1104 are switched off. Thereby, the IN1 signal is coupled to the output 1105 and becomes the OUT signal. Conversely, if C0 goes high and C1 goes low, the p-channel transistor 1101 and the n-channel transistor 1102 are switched off, while the p-channel transistor 1103 and the n-channel transistor 1104 are switched on. Hence, the IN2 signal is coupled to output 1105 and becomes the OUT signal.

Figure 12:
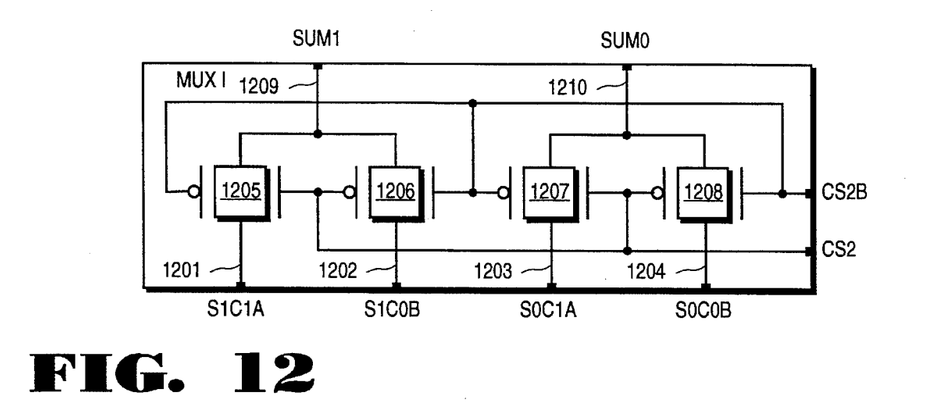
FIG. 12 is a circuit diagram illustrating another multiplexer of the sum generator.

FIG. 12 is a circuit diagram illustrating a multiplexer 1200. Multiplexer 1200 corresponds to the multiplexer 1016 (as shown in FIG. 10). It selects two sum bits SUM0 and SUM1 to output from four input signals on lines 1201–1204 based on the CS2 and CS2B signals. If CS2 is set low and CS2B is set high, passgates 1206 and 1208 are switched on, while passgates 1205 and 1207 are switched off. Thereby, the signals on lines 1202 and 1204 are coupled to output lines 1209 and 1210 and are output as the SUM1 and SUM0 bits. If CS2 is set high and CS2B is set low, passgates 1206 and 1208 are switched off. Thereby, the signals on lines 1201 and 1203 are coupled to output lines 1209 and 1210 and are output as the SUM0 and SUM1 bits. In short, referring back to FIG. 10, if CS2 is low and CS2B is high, the output signals from multiplexers 1013 and 1006 respectively become the SUM1 and SUM0 bits. Otherwise, if CS2 is high and CS2B is low, the output signals from multiplexers 1012 and 1014 respectively become the SUM1 and SUM0 bits.

Figure 13:
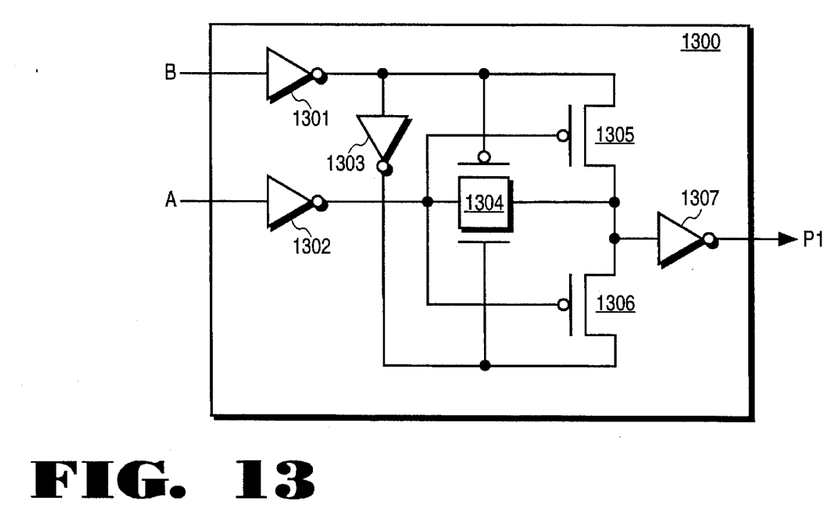
FIG. 13 is a circuit diagram illustrating one logic block of the sum generation circuit.

FIG. 13 is a circuit diagram illustrating logic block 1300 of the sum generation circuit (i.e., blocks 1001 and 1002 of FIG. 10). One of the two input bits, A, (e.g., A0 and B0 or A1 and B1) is input to inverter 1301, while the other input bit, B, is input to inverter 1302.

If AB="00", passgate 1304 is switched off because inverter 1301 sets the p-channel gate high while the n-channel gate is set low by inverter 1303. Transistor 1305 is switched off, and transistor 1306 is switched on. Hence, a "0" is input to inverter 1307, and the output from block 1300 is a 1. If AB="01", passgate 1304 is switched on. Hence, a 1 is input to inverter 1307, and the output from block 1300 is a 0. If AB="10", passgate 1304 is switched off. Transistor 1305 is switched on, and transistor 1306 is switched off. Hence, a "1" is input to inverter 1307, and the output from block 1300 is "0". If AB = 11, passgate 1304 is switched on. Hence, a "0" is input to inverter 1307, and a "1" is output from logic block 1300. In general, logic block 1300 performs the function of an XNOR gate.

Detailed Description of the Carry Generation Circuit

Figure 14:
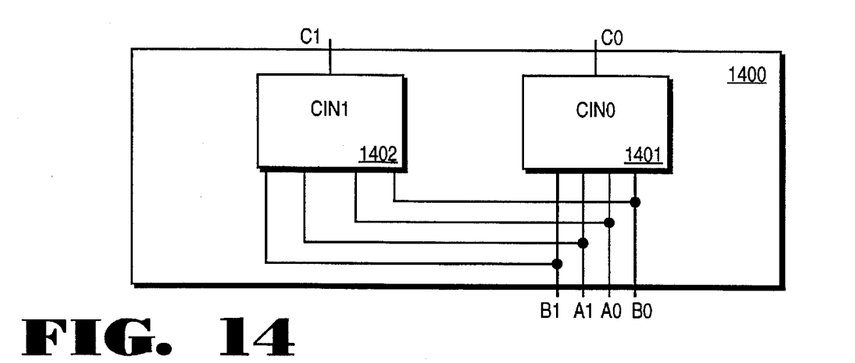
FIG. 14 is a circuit diagram illustrating one embodiment of the carry generation circuit.

FIG. 14 is a circuit diagram illustrating one embodiment of the carry generation circuit 1400. The carry circuit 1400 generates two carry-out signals CO and $C_1$ based on the four input bits A0–A1 and B0–B1. The CO signal is generated assuming that the carry-in is "0". It is generated by the CIN0 block 1401. The $C_1$ signal is generated assuming that the carry-in is a 1. It is generated by the CIN1 block 1402. Table 3 is a truth table illustrating the function of the carry generation circuit.

TABLE 3

| A1 | A0 | B1 | B0 | C1 | C0 |
|----|----|----|----|----|----|
| 0 | 0 | 0 | 0 | 0 | 0 |
| 0 | 0 | 1 | 0 | 0 | 0 |
| 0 | 0 | 0 | 1 | 0 | 0 |
| 0 | 0 | 1 | 1 | 1 | 0 |
| 1 | 0 | 0 | 0 | 0 | 0 |
| 1 | 0 | 1 | 0 | 1 | 1 |
| 1 | 0 | 0 | 1 | 1 | 0 |
| 1 | 0 | 1 | 1 | 1 | 1 |
| 0 | 1 | 0 | 0 | 0 | 0 |
| 0 | 1 | 1 | 0 | 1 | 0 |
| 0 | 1 | 0 | 1 | 0 | 0 |
| 0 | 1 | 1 | 1 | 1 | 1 |
| 1 | 1 | 0 | 0 | 1 | 0 |
| 1 | 1 | 1 | 0 | 1 | 1 |
| 1 | 1 | 0 | 1 | 1 | 1 |
| 1 | 1 | 1 | 1 | 1 | 1 |

Figure 15:
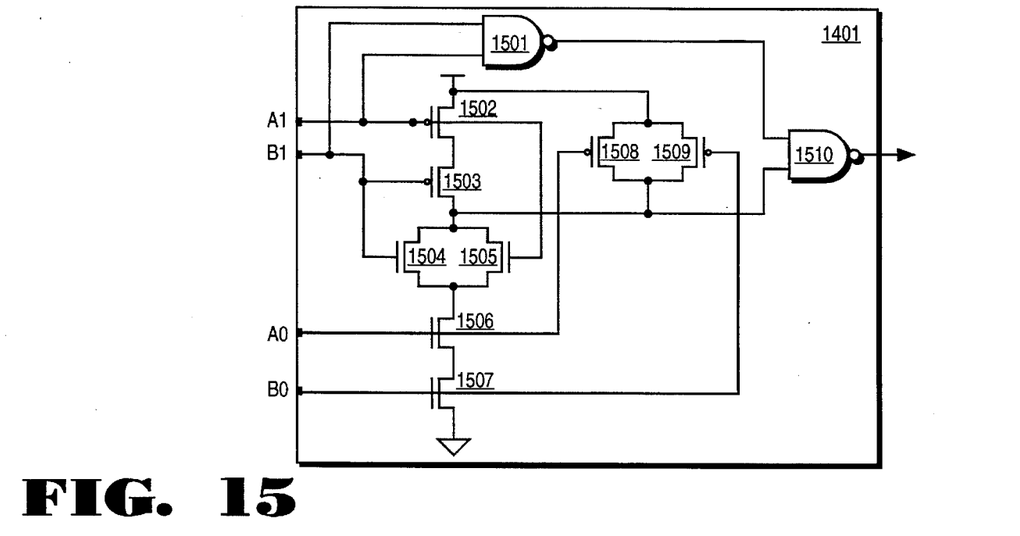
FIGS. 15 and 16 are circuit diagrams illustrating the CIN0 and CIN1 blocks of the carry generation circuit.
Figure 16:
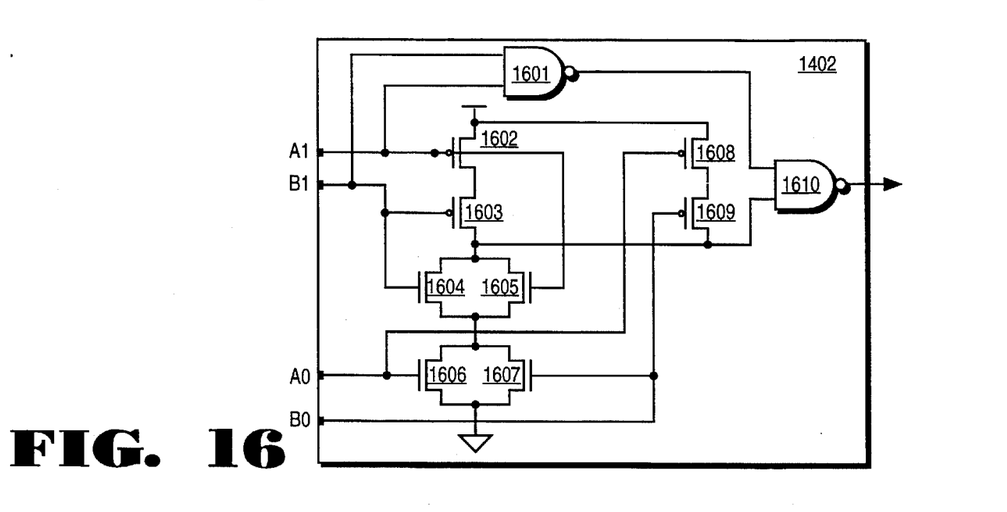

FIGS. 15 and 16 are circuit diagrams illustrating the CIN0 block 1401 and CIN1 block 1402 in greater detail.

An example is now offered to describe how these blocks operate. Referring to FIG. 15, supposing that A1A0="01" and B1B0="10", then the output from NAND gate 1501 is a "1". Transistors 1502, 1504, 1506, and 1509 are switched on. Transistors 1503, 1505, 1507, and 1508 are switched off. Hence, two "1"s are input to NAND gate 1510, and a "0" is output by the CIN0 block 1401.

Referring to FIG. 16, if A1A0="01" and B1B0="10", then the output from NAND gate 1601 is a "1". Transistors 1602, 1604, 1606, and 1609 are switched on. Transistors 1603, 1605, 1607, and 1608 are switched off. Hence, a "10" is input to NAND gate 1610, and a "1" is output by the CIN1 block 1402.

Figure 17A:
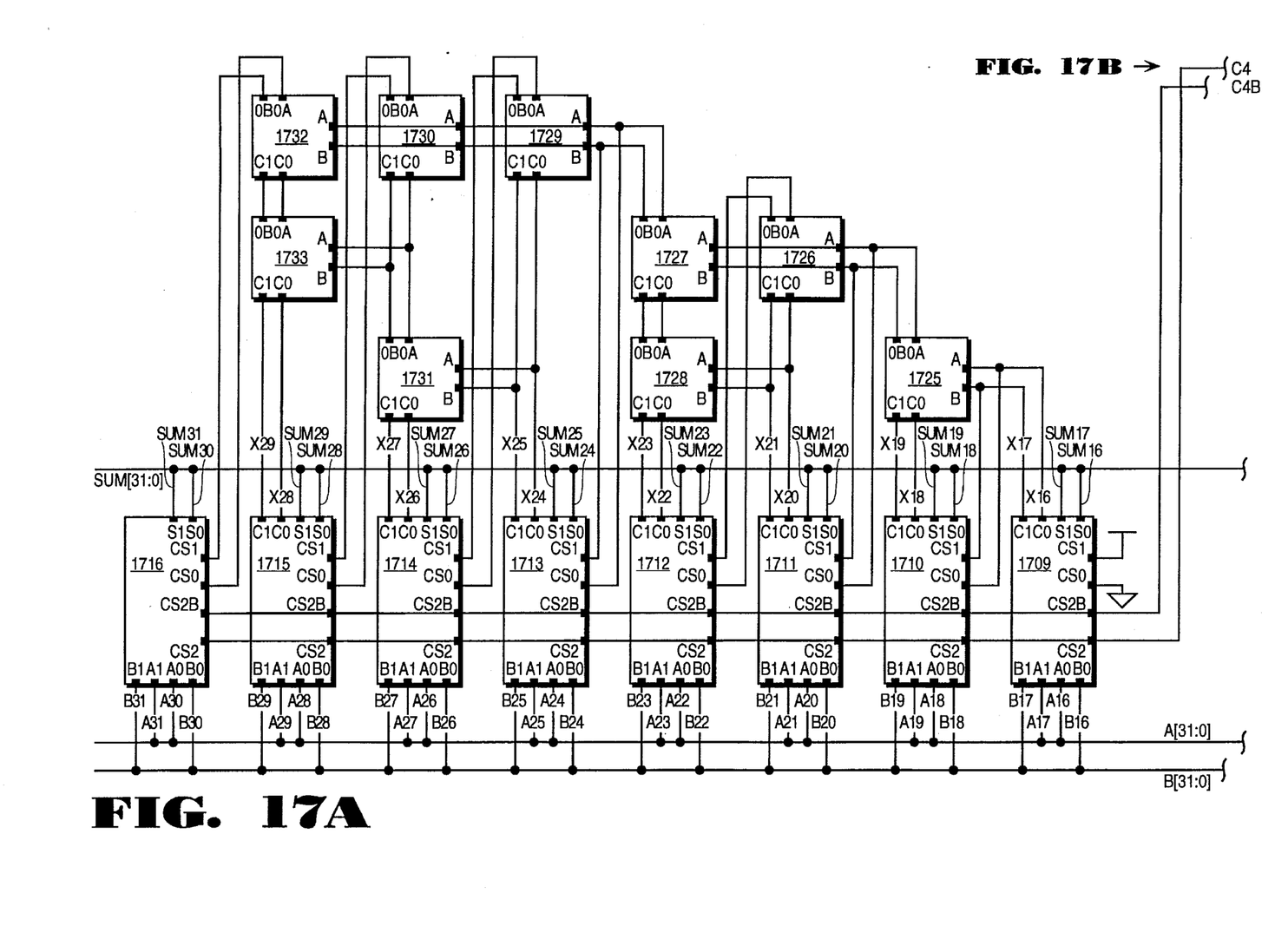
FIGS. 17A and 17B are circuit diagrams illustrating in greater detail, a 32-bit adder embodying the present invention.
Figure 17B:
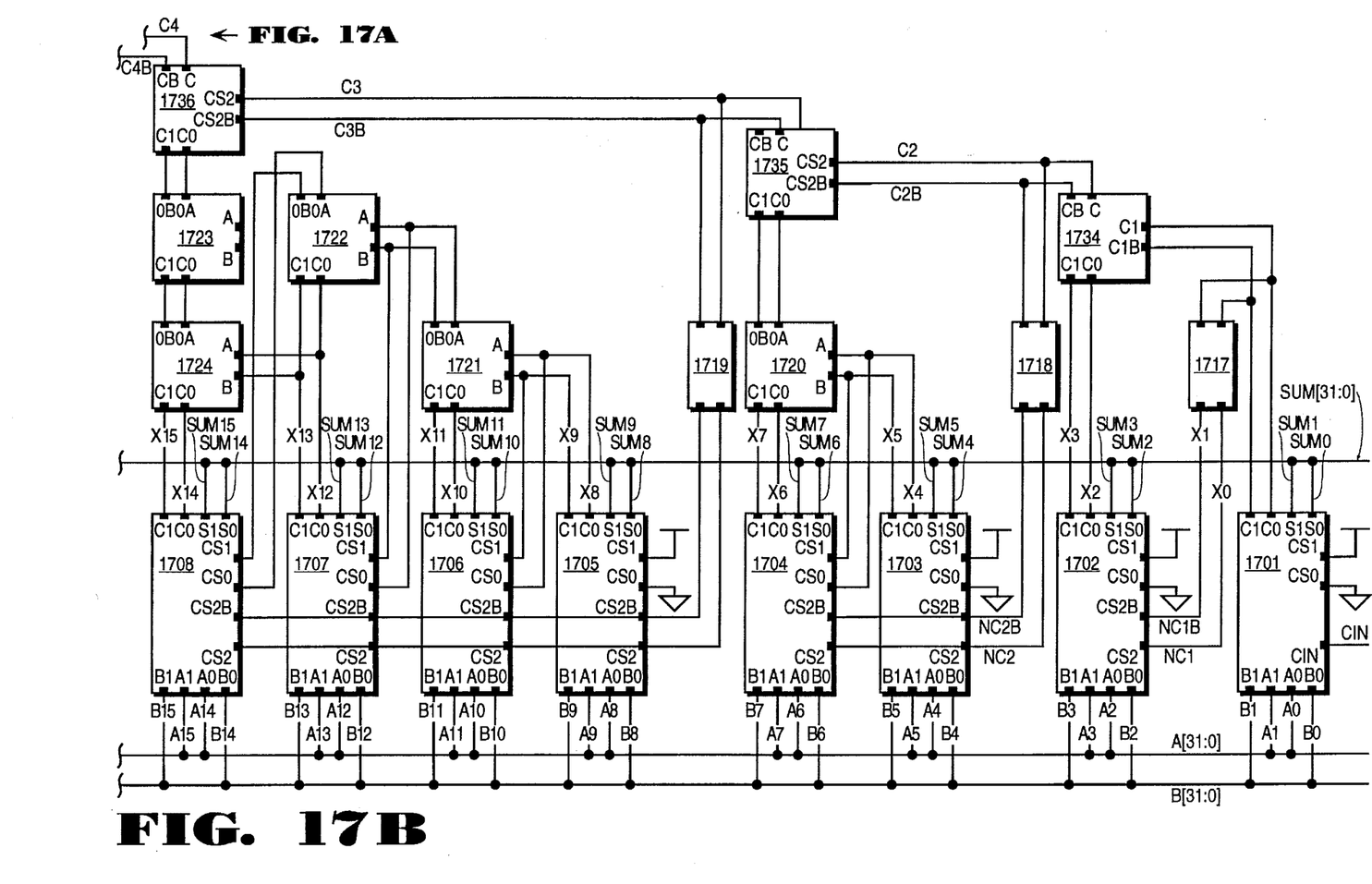

FIGS. 17A–B illustrate more detailed circuit diagrams of a 32-bit adder embodiment of the present invention. Each of the levels are broken into their respective 2-bit adders and multiplexers. For example, the first level comprises the 2-bit adder 1701, which computes the two least significant sum bits SUM0 and SUM1. The two carry out signals from the 2-bit adder 1701 are input to multiplexer 1734 and determines which of the two carry out signals from the 2-bit adder 1702 is selected. The second level comprises the 2-bit adder 1702. Its two carry-out signals are input to multiplexer 1734. The third level is comprised of the 2-bit adders 1703–1704 and multiplexer 1720. The two carry out signals from multiplexer 1720 are input to multiplexer 1735. The fourth level is comprised of the 2-bit adders 1705–1708 and multiplexers 1721–1724. The two carry out signals from multiplexer 1723 are input to multiplexer 1736. The fifth level is comprised of the 2-bit adders 1709–1716 and multiplexers 1725–1733. Three inverter blocks 1717–1719 are used to invert the carry out signals being input to the 2-bit adders 1702, 1703, and 1705.

Thus, for the 32-bit adder embodiment of the present invention, the most significant sum bit has a total delay of just four multiplexer gates plus the delay associated with generating the first carry bit. Of the four multiplexer gates in the critical path, three multiplexers are used to propagate the first carry bit to the fourth carry bit, and one multiplexer is used in the sum circuit.

It should be noted that adding one additional level doubles the number of bits which can be added together while introducing just one additional multiplexer gate delay in the critical path for each level added. For example, a 64-bit adder can be implemented by adding one more level and one more multiplexer to the 32-bit adder design.

Thus, a fast CMOS conditional sum adder having a hierarchical architecture is disclosed.

What is claimed is:

1. An N-bit conditional sum adder, wherein N is a number of bits to be added, said adder comprising:

X number of M-bit adders coupled together, wherein X * M=N and wherein one of said M-bit adders includes a sum circuit coupled to a plurality of input lines for generating sum bits by adding together a plurality of input bits corresponding to said input lines, said one of said M-bit adders also including a carry circuit coupled to said input lines for generating a first carry signal assuming a preceding M-bit adder outputs a carry and generating a second carry signal assuming said preceding M-bit adder outputs no carry;

a first buffer coupled to said carry circuit for generating a buffered first carry signal;

a second buffer coupled to said carry circuit, parallel to said first buffer, for also generating said buffered first carry signal;

a first inverter coupled to an output of said second buffer for generating an inverted buffered first carry signal;

a third buffer coupled to said carry circuit for generating a buffered second carry signal;

a fourth buffer coupled to said carry circuit, parallel to said third buffer, for also generating said buffered second carry signal;

a second inverter coupled to an output of said fourth buffer for generating an inverted buffered second carry signal; and, a selector circuit having four passgates coupled to receive said buffered first carry signal, said inverted buffered first carry signal, said buffered second carry signal, and said inverted buffered second carry signal for generating a carry according to whether said preceding M-bit adder outputs a carry or said preceding M-bit adder outputs no carry.

2. The N-bit conditional sum adder of claim 1, wherein said passgates comprise p-n passgates.

3. The N-bit conditional sum adder of claim 1, wherein said first, second, third and fourth buffers comprise inverters.

4. The N-bit conditional sum adder of claim 1, wherein M=2.

5. The N-bit conditional sum adder of claim 1 wherein the sum circuit includes only 5 multiplexers coupled together for generating sum bits such that each sum bit is processed by a maximum of two multiplexers in series irrespective of the number of overall bits being added.

6. An N-bit conditional sum adder comprising:

X number of intercoupled 2-bit conditional sum adders, wherein 2*X=N and wherein one of said conditional sum adders includes a sum generation circuit coupled to 2×M number of input lines for generating M sum bits by adding together a plurality of input bits corresponding to said input lines and a carry generation circuit also coupled to said 2×M input lines for generating a first carry signal presuming that there is a carry from a preceding M-bit adder and for generating a second carry signal that there is no carry from said preceding M-bit adder;

a first inverter coupled to said carry generation circuit for generating an inverted first carry signal;

a second inverter coupled to said carry generation circuit for generating an inverted second carry signal;

a plurality of buffers coupled to said carry generation circuit for buffering said first carry signal and said second carry signal; and.

a selector circuit having a plurality of passgates for selecting either said first carry signal or said second carry signal and either said inverted first carry signal or said inverted second carry signal for output to a succeeding M-bit adder and to a succeeding multiplexer.

7. The N-bit conditional sum adder of claim 6, wherein said selector circuit makes a selection according to said carry from said preceding M-bit adder and a complement of said carry from said preceding M-bit adder.

8. The N-bit conditional sum adder of claim 6, wherein said plurality of buffers comprise inverters.

9. The N-bit conditional sum adder of claim 6 wherein the sum generation circuit includes only 5 multiplexers coupled together for generating sum bits such that each sum bit is processed by a maximum of two multiplexers in series irrespective of the number of overall bits being added.

10. An apparatus for adding N-bits comprising:

an X number of M-bit conditional sum adders coupled together, wherein N=X*M and wherein one of said M-bit adders includes a summing means coupled to a plurality of input lines for summing a plurality of input bits corresponding to said input lines and a carry means coupled to said input lines for generating a first carry signal assuming a carry signal indicating a carry from a preceding M-bit adder and generating a second carry signal assuming said carry signal indicating no carry from said preceding M-bit adder;

a first inverting means coupled to said carry means for generating an inverted first carry signal;

a second inverting means coupled to said carry means for generating an inverted second carry signal;

a plurality of buffer means for generating a buffered first carry signal, a buffered second carry signal, a buffered inverted first carry signal, and a buffered inverted second carry signal; and.

a selecting means for selecting one of said buffered first carry signal and said buffered second carry signal and for selecting one of said buffered inverted first carry signal and said buffered inverted second carry signal for output to a succeeding M-bit adder and to a succeeding selecting means.

11. The apparatus of claim 10, wherein said selecting means is controlled by said carry signal from said preceding M-bit adder and a complement of said carry signal from said preceding M-bit adder.

12. The apparatus of claim 10, wherein said plurality of buffer means comprise inverting means.

13. The apparatus for adding N-bits of claim 10 wherein the summing means includes only 5 multiplexers coupled together for generating sum bits such that each sum bit is processed by a maximum of two multiplexers in series irrespective of the number of overall bits being added.

14. A computer system having a bus coupling a memory for storing digital data, a microprocessor for processing said digital data, and a display circuit for driving a display according to said microprocessor, said microprocessor comprising:

(a) a plurality of registers for storing some of said digital data;

(b) a control unit for performing control functions on said digital data in said plurality of registers;

(c) an arithmetic logic unit for performing arithmetic functions on said digital data in said plurality of registers, said arithmetic logic unit including an N-bit conditional sum adder, wherein N is a number of bits to be added, said adder comprising:

(i) X number of M-bit adders coupled together, wherein X*M=N and wherein one of said M-bit adders includes a sum circuit coupled to a plurality of input lines for generating sum bits by adding together a plurality of input bits corresponding to said input lines, said one of said M-bit adders also including a carry circuit coupled to said input lines for generating a first carry signal assuming a preceding M-bit adder outputs a carry and generating a second carry signal assuming said preceding M-bit adder outputs no carry;

(ii) a first buffer coupled to said carry circuit for generating a buffered first carry signal;

(iii) a second buffer coupled to said carry circuit, parallel to said first buffer, for also generating said buffered first carry signal;

(iv) a first inverter coupled to an output of said second buffer for generating an inverted buffered first carry signal;

(v) a third buffer coupled to said carry circuit for generating a buffered second carry signal;

(vi) a fourth buffer coupled to said carry circuit, parallel to said third buffer, for also generating said buffered second carry signal;

(vii) a second inverter coupled to an output of said fourth buffer for generating an inverted buffered second carry signal: and.

(viii) a selector circuit having four passgates coupled to receive said buffered first carry signal, said inverted buffered first carry signal, said buffered second carry signal, and said inverted buffered second carry signal for generating a carry according to whether said preceding M-bit adder outputs a carry or said preceding M-bit adder outputs no carry.

15. The computer system of claim 14, wherein said passgates of said N-bit conditional sum adder comprise p-n passgates.

16. The computer system of claim 14, wherein said first, second, third, and fourth buffers of said N-bit conditional sum adder comprise inverters.

17. The computer system of claim 14, wherein M=2.

18. The computer system of claim 14 wherein the sum circuit includes only 5 multiplexers coupled together for generating sum bits such that each sum bit is processed by a maximum of two multiplexers in series irrespective of the number of overall bits being added.

19. A computer system having a bus coupling a memory for storing digital data, a microprocessor for processing said digital data, and a display circuit for driving a display according to said microprocessor, said microprocessor comprising:

(a) a plurality of registers for storing some of said digital data;

(b) a control unit for performing control functions on said digital data in said plurality of registers;

(c) an arithmetic logic unit for performing arithmetic functions on said digital data in said plurality of registers, said arithmetic logic unit including an N-bit conditional sum adder comprising:

(i) x number of intercoupled 2-bit conditional sum adders, wherein 2*X=N and wherein one of said conditional sum adders includes a sum generation circuit coupled to 2×M number of input lines for generating M sum bits by adding together a plurality of input bits corresponding to said input lines and a carry generation circuit also coupled to said 2×M input lines for generating a first carry signal presuming that there is a carry from a preceding M-bit adder and for generating a second carry signal presuming that there is no carry from said preceding M-bit adder;

(ii) a first inverter coupled to said carry generation circuit for generating an inverted first carry signal;

(iii) a second inverter coupled to said carry generation circuit for generating an inverted second carry signal;

(iv) a plurality of buffers coupled to said carry generation circuit for buffering said first carry signal and said second carry signal; and, (v) a selector circuit having a plurality of passgates for selecting either said first carry signal or said second carry signal and either said inverted first carry signal or said inverted second carry signal for output to a succeeding M-bit adder and to a succeeding multiplexer.

20. The computer system of claim 19, wherein said selector circuit of said N-bit conditional sum adder makes a selection according to said carry from said preceding M-bit adder and a complement of said carry from said preceding M-bit adder.

21. The computer system of claim 19, wherein said plurality of buffers comprise inverters.

22. The computer system of claim 19 wherein the sum generation circuit includes only 5 multiplexers coupled together for generating sum bits such that each sum bit is processed by a maximum of two multiplexers in series irrespective of the number of overall bits being added.

23. A computer system having a bus means for coupling a memory means for storing digital data, a microprocessor means for processing said digital data, and a means for driving a display means according to said microprocessor means, said microprocessor means comprising:

(a) a plurality of register means for storing a set of said digital data;

(b) a control unit means for performing control functions on said digital data in said plurality of register means;

(c) an arithmetic logic means for performing arithmetic functions on said digital data in said plurality of register means, said arithmetic logic means comprising:

(i) a plurality of multiple-bit conditional sum adders coupled together, wherein one of said multiple-bit conditional sum adders includes a summing means coupled to a plurality of input lines for summing a plurality of input bits corresponding to said input lines and a carry means coupled to said input lines for generating a first carry signal assuming a carry signal indicating a carry from a preceding multiple-bit conditional sum adder and generating a second carry signal assuming said carry signal indicating no carry from said preceding multiple-bit conditional sum adder;

(ii) a first inverting means coupled to said carry means for generating an inverted first carry signal;

(iii) a second inverting means coupled to said carry means for generating an inverted second carry signal;

(iv) a plurality of buffer means for generating a buffered first carry signal, a buffered second carry signal, a buffered inverted first carry signal, and a buffered inverted second carry signal; and.

(v) a selecting means for selecting one of said buffered first carry signal and said buffered second carry signal and for selecting one of said buffered inverted first carry signal and said buffered inverted second carry signal for output to a succeeding multiple-bit conditional sum adder and to a succeeding selecting means.

24. The computer system of claim 23, wherein said selecting means is controlled by said carry signal from said preceding multiple-bit conditional sum adder and a complement of said carry signal from said preceding multiple-bit conditional sum adder.

25. The computer system of claim 23, wherein said plurality of buffer means comprising inverting means.

26. The computer system of claim 23 wherein the summing means includes only 5 multiplexers coupled together for generating sum bits such that each sum bit is processed by a maximum of two multiplexers in series irrespective of the number of overall bits being added.

* * * * *

UNITED STATES PATENT AND TRADEMARK OFFICE
CERTIFICATE OF CORRECTION

PATENT NO. : 5,471,414
DATED : November 28, 1995
INVENTOR(S) : Kumar et al.

It is certified that error appears in the above-identified patent and that said Letters Patent is hereby corrected as shown below:

In column 7 at line 7 delete "601" and insert --600--.

In column 8 at line 59 delete "81S-816" and insert --815-816--

In column 10 at line 41 delete "CO and $C_1$" and insert --CO and C1--

In column 10 at line 42 delete "$C_1$ is high," and insert --C1 is high,--

In column 11 at line 29 delete "CO and $C_1$" and insert --CO and C1--

In column 11 at line 32 delete "$C_1$ signal" and insert --C1 signal--

In column 13 at line 29 insert --presuming-- following "signal" and prior to "that"

Signed and Sealed this

Twenty-first Day of January, 1997

Attest:

BRUCE LEHMAN

*Attesting Officer*     *Commissioner of Patents and Trademarks*